Patented Dec. 16, 1952

2,622,095

UNITED STATES PATENT OFFICE 2,622,095

PREPARATION OF ORGANIC THIOPHOSPHATES

Kent C. Brannock, Kingsport, Tenn., assignor to Eastman Kodak Company, Rochester, N. Y., a corporation of New Jersey No Drawing. Application December 14, 1950, Serial No. 200,867

9 Claims. (Cl. 260—461)

This invention relates to a method for preparing neutral alkyl thiophosphates by the reaction of phosphorus pentasulfide with an alkyl ester of an ortho carboxylic acid or an ortho thiocarboxylic acid at an elevated temperature.

Various methods have been described in the prior art for preparing thiophosphates, but ordinarily, chlorine-containing intermediates have been used in the preparation of these compounds. I have found, however, that the alkyl orthoformates and the alkyl ortho acetates readily react with phosphorus pentasulfide to form alkyl thiophosphates by a reaction in which the simple esters are distilled off leaving a residue from which the thiophosphate may be readily obtained. The advantage of this method of preparing the thiophosphates is that excellent yields are obtained without the necessity of using chlorine-containing intermediates. Also the processes are carried out at atmospheric pressure and moderate temperatures.

One object of my invention is to provide a method for preparing alkyl thiophosphates. Another object of my invention is to provide a method of preparing alkyl thiophosphates in which an alkyl ortho carboxylic acid ester is employed as the starting material. A further object of my invention is to provide a method of preparing alkyl thiophosphates at atmospheric pressure and moderate temperatures. A still further object of my invention is to provide a process of preparing alkyl thiophosphates without the use of chlorine-containing intermediates. Other objects of my invention will appear herein.

In its broadest aspects, my invention comprises mixing together phosphorus pentasulfide and an alkyl ester of an ortho carboxylic or thiocarboxylic acid in a closed reaction vessel using an elevated temperature below the boiling point of the ortho ester used. For instance in the case of ethyl orthoformate, the reaction temperature is preferably between the boiling point of the simple ester and that of the ortho ester while in the case of the thio compound it would be preferred to operate below the boiling points of both the simple ester and the ortho ester. The reactions which occur in my process may be represented by the following equations:

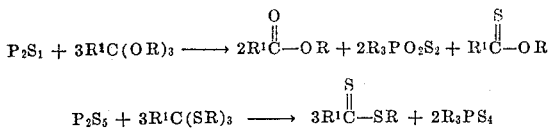

in which R may be any alkyl group while $R^1$ may be either hydrogen, alkyl or aryl. Considering these equations in the case of orthoformates, it may be seen that one of the products resulting is an alkylformate and in carrying out the process as described, the alkylformate will be distilled off as the reaction progresses, the phosphorus-containing compound remaining in the reaction vessel. The product thus obtained is in crude form and may be useful in that form or if desired, it may be refined by distillation either at atmospheric pressure or at a reduced pressure. The temperature of the reaction ordinarily will be within the range of 50–200° C., this value depending upon that which is most efficacious with the particular alkyl ester which is employed for the reaction.

Alkyl esters which have been found to be particularly useful in processes in accordance with my invention are ethyl orthoformate, ethyl ortho acetate, methyl orthoformate, ethyl ortho thioformate, and isopropyl orthoformate. In the formulas which have been given herein, it is preferred that the alkyl groups be of 1 to 4 carbon atoms in order to achieve the best results.

Compounds prepared according to my invention have been found to be useful for insecticidal purposes either with or without further treatment. These compounds may be mixed with an inert carrier if desired as is well known in that art.

I have found in the case of the esters of the thio carboxylic acids that intermediate esters may be obtained such as of meta thiophosphoric acid and pyro thiophosphoric acid. Thus, by using only one mole of an ortho thioformate ester, the meta thiophosphate primarily results, whereas by using two moles, the pyro ester may be obtained. Thus, if the ortho thiophosphate is primarily desired, at least three moles of the ortho thioformate should be employed in the reaction.

The following examples illustrate my invention:

Example I

Sixty-one grams of $P_2S_5$ and 134 g. of ethyl orthoformate were combined in a 500 cc. flask equipped with a distillation apparatus. There was no perceptible reaction at room temperature. Using good agitation, the temperature was raised over a 15-minute period to 95°, at which temperature an exothermic reaction began. Heating was discontinued, and the temperature rose to 100° and remained at 100° for 15 minutes before beginning to fall. During this time ethyl formate and ethyl thioformate distilled off from the reaction mixture. Heating was resumed, and the temperature was raised to 150° over the next 30 minutes while more of the simple esters was distilled off. Distillation of the reaction product at 0.65 mm. gave an additional small quantity of the sample formate esters, 5.5 g. of ethyl orthoformate, and 109 g. of crude ethyl dithio phosphate, 92.5% of the theoretical. Redistillation of this crude product gave 98 g. of pure ethyl dithio phosphate, (boiling point 115°/10 mm., $N_D^{20}$ 1.5010).

The ethyl thiophosphate shows good insecticidal activity as evidenced by a 100% kill of fruit flies in 45 minutes. Some of this material when treated with $SOCl_2$ was found when test was made on fruit flies to give a 96% kill in 15 minutes and a 100% kill in 30 minutes. This toxicity compares favorably with that of tetraethyl pyrophosphate to fruit flies. As an additional advantage the ethyl thiophosphates are more stable to water than tetraethyl pyrophosphate.

*Example II*

22 parts of $P_2S_5$ and 60 parts of ethyl orthothioformate were mixed together in a reaction vessel and were heated to 100° C. over a one-hour period with occasional agitation and were maintained at that temperature for one-half hour. The mass was immediately subjected to vacuum distillation at a pressure of 0.3 mm. Ethyl dithioformate distilled over and was collected in a Dry Ice trap. On standing this ethyl dithioformate forms a viscous, yellow syrup through polymerization. 34.4 parts of ethyl dithioformate was obtained, this being slightly in excess of theoretical due to a small amount of diethyl sulfide present. In addition there was obtained 28.8 g. of triethyl thiophosphate, $(C_2H_5)_3PS_4$, or 59% of theoretical. The boiling point of the product was 118–119°/2 mm.

I claim:

1. A method for preparing neutral organic thiophosphates which comprises heating together $P_2S_5$ and an ester selected from the lower group consisting of the alkyl esters of the ortho lower aliphatic carboxylic acids and the ortho thio lower aliphatic carboxylic acids.

2. A method of preparing a neutral alkyl thiophosphate which comprises heating together $P_2S_5$ and a lower alkyl ester of an ortho lower aliphatic carboxylic acid.

3. A method for preparing neutral alkyl thiophosphates which comprises heating together a mixture of $P_2S_5$ and a lower alkyl ester of an orthothio lower aliphatic carboxylic acid.

4. A method of preparing ethyl thiophosphate which comprises heating a mixture of $P_2S_5$ and ethyl orthoformate for a sufficient time to cause a reaction to occur.

5. A method of preparing an ethyl thiophosphate which comprises heating together a mixture of $P_2S_5$ and ethyl orthoformate whereby the ethyl formate formed in the resulting reaction is distilled off and subsequently subjecting the material thus obtained to distillation whereby an ethyl thiophosphate is obtained as the distillate.

6. A method for preparing neutral organic thiophosphates which comprises heating together $P_2S_5$ and an ester selected from the group consisting of the lower alkyl esters of the ortho lower aliphatic carboxylic acids and the ortho thio lower aliphatic carboxylic acids at a temperature in the range of 50–200° C.

7. A method of preparing ethyl thiophosphate which comprises heating a mixture of $P_2S_5$ and ethyl orthoformate for at least 15 minutes at a temperature of at least 95° C.

8. A method according to claim 7, wherein said heating is followed by a subsequent heating at about 150° C. for about 30 minutes.

9. A method of preparing triethyl thiophosphate which comprises heating a mixture of $P_2S_5$ and ethyl ortho thioformate to about 100° C. over a one hour period, maintaining the mixture at that temperature for about one-half hour, and then separating triethyl thiophosphate

KENT C. BRANNOCK.

REFERENCES CITED

The following references are of record in the file of this patent:

Levaillant, Compte Rendus, vol. 195, pp. 882–884 (1932).